Oct. 19, 1926.
L. BREGUET
1,603,659
INTERNAL COMBUSTION ENGINE
Filed June 1, 1923   2 Sheets-Sheet 2
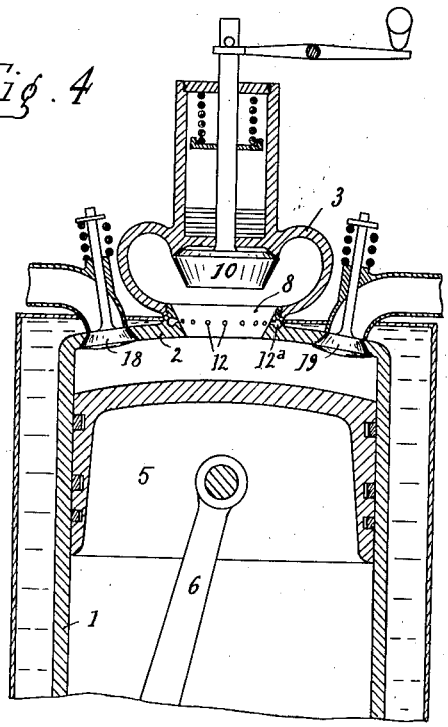
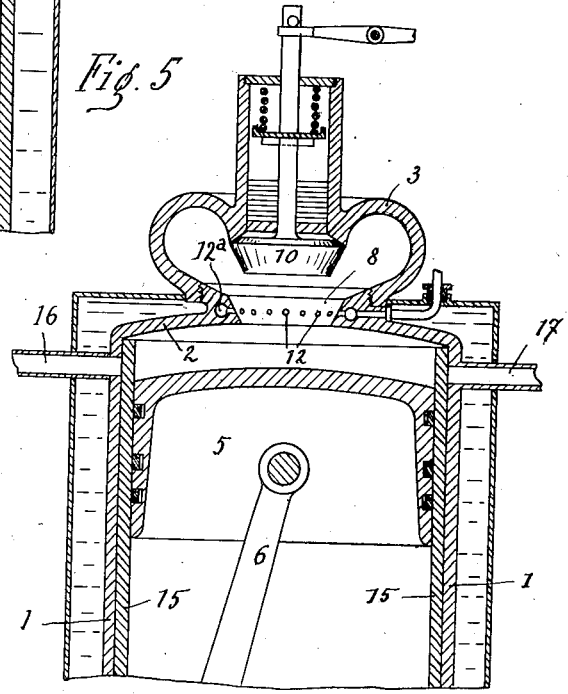
INVENTOR
Louis Breguet
BY
Mauro, Cameron, Lewis & Kerkam
ATTORNEYS Patented Oct. 19, 1926.

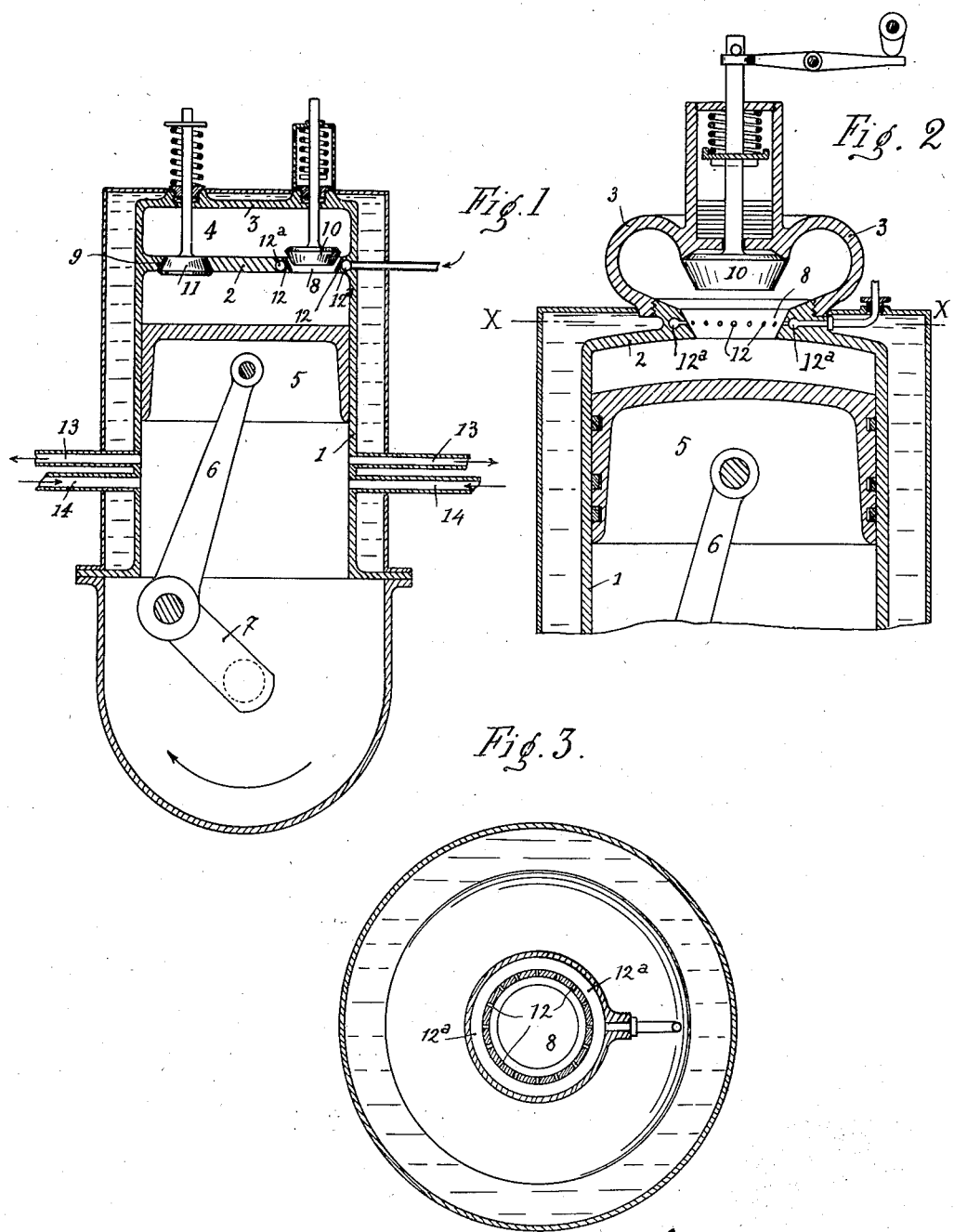

1,603,659

UNITED STATES PATENT OFFICE.

LOUIS BREGUET, OF PARIS, FRANCE, ASSIGNOR TO THE SOCIÉTÉ ANONYME DES ATELIERS D'AVIATION LOUIS BREGUET, OF PARIS, FRANCE.

INTERNAL-COMBUSTION ENGINE.

Application filed June 1, 1923, Serial No. 642,844, and in France June 12, 1922.

The present invention relates to an internal combustion engine operating upon gasoline or heavy hydrocarbons.

According to the principle of the invention, I provide not only for the combustion of the fuel as in the Diesel or semi-Diesel engines, but also for the carburetion which is effected by mechanical means and takes place immediately before the combustion. For this purpose, the preliminarily compressed air is supplied at the bottom of the cylinder through a valve which is lifted to uncover the fuel inlet orifices, the said valve thus acting as a carbureter. Furthermore, in one embodiment of the invention the air is compressed in the engine cylinder itself, and when at a sufficient compression the air is caused to flow abruptly through the said carbureter-valve into a closed chamber wherein the complete combustion is effected and the resulting augmented pressure is directly utilized upon the piston of the engine cylinder in order to produce the power stroke.

The special features of the said engine result from this method of preliminary carburetion. In the first place, substantially the whole amount of oxygen in the compressed air will thus be consumed, and secondly the rate of combustion is made to depend upon the velocity of the outflow of air through the said carbureter-valve, and not as in the Diesel engine upon the rapidity of the progressive inflammation of the injected fuel.

Due to the high rate of combustion employed, I am enabled to obtain a high piston speed and consequently an unusually high speed for the crankshafts actuated by the piston rods.

The following description relates to a two-stroke engine and is given by way of example as disclosing the principles of the said invention and the means employed for obtaining a high rate of discharge of the air through the said carbureter-valve.

In the drawings—

Fig. 1 is a cross-section of the engine.

Fig. 2 is a like section of the upper part of the cylinder in the first embodiment of the invention.

Fig. 3 is a section on the line X—X of Fig. 2.

Figs. 4 and 5 are modifications of the embodiment shown in Fig. 2.

As shown in Fig. 1, the cylinder 1 comprises a bottom 2 and a double bottom 3 between which is situated the chamber 4. The said cylinder has, movable therein, the piston 5 which actuates the crankshaft 7 by means of the piston rod 6. The stroke of the engine is such that the said piston will come close upon the bottom 2, thereby reducing the useless space to a minimum. The two apertures 8 and 9 are formed in the bottom 2 and can be respectively closed by the valves 10 and 11.

The valve 10 serves as a cheek valve for the communication between the cylinder and the chamber 4 and also as a carburetor-valve. On the one hand, when the piston rises and the previously withdrawn airs is compressed to a suitable degree, for instance 25 kgs. per sq. cm., the valve 10 will open and thus allow the compressed air to flow from the cylinder into the chamber 4, and it is obvious that this flow may be very rapid.

On the other hand, a plurality of small orifices 12 are formed in the seat of the valve 10, through which the liquid fuel is injected from a suitable conduit 12$^a$ under the action of an adjustable pump driven by the engine: said orifices are uncovered by the valve simultaneously, and the air flowing through the aperture 8 will thus be corbureted and the mixture will be at once ignited, so that the device operates as a fuel burner.

It will be noted that the valve 10 serves as a veritable internal carbureter; the size of the orifices 12 is such that under the action of the fuel pump the amounts of fuel will be substantially proportional to the amounts of air drawing the same forward.

The volume of the chamber 4 is such that upon completion of the combustion the mixture will have the desired pressure which may be as high as 30—35 kgs. per sq. cm.

At this time the piston commences to clear the upper dead center, the valve 10 remains open, and the ignited mixture contained in the chamber 4 will proceed thence in the opposite direction through the aperture 8, thus acting upon the piston and causing it to descend in the cylinder 1. The valve 11 opens at the same time so that the ignited mixture may flow from the chamber 4 into the cylinder with greater facility.

The piston then attains the bottom of the stroke, first uncovering the ports 13 for the exhaust and then the ports 14 through which a suitable compressor delivers the fresh air which is to fill up the cylinder and is subsequently compressed upon the ascent of the piston.

The valve 11 and the aperture 9 may obviously be eliminated, and the valve 10 with the aperture 8 will be sufficient for the purpose; in this event the aperture 8, Fig. 2, is coaxial with the bottom 2, and the double bottom 3 has preferably the shape of a hollow torus. It is evident that the said torus need not be cooled, and it is even preferable to allow it to attain a red heat; in these conditions, it will be made of a suitable metal such as tungsten steel.

The carbureter-valve 10 may be cooled in the known manner by an internal oil circulation, and the valve guide may also be cooled by an oil or a water circulation in order to avoid gripping.

In particular, in order to provide a tight working for the said valve when open, it may be constructed in the same manner as the valve whose principle is disclosed in my U. S. Patent No. 1,512,673, dated October 21, 1924.

It is further evident that if a valve such as 11 is employed it may be given the form of a sleeve adapted to uncover suitable orifices. Obviously, the engine may be of the four-stroke type, in which case the admission and exhaust will take place either by means of a sleeve 15 uncovering the exhaust ports 16 and the inlet ports 17, Fig. 5, or by the use of additional inlet and exhaust valves 18 and 19, Fig. 4.

The valve 10 also acts to a certain degree as a safety valve, i. e., if by reason of a leakage of the liquid fuel an explosion of the fuel and air mixture should occur during the compression, the valve 10 will be automatically lifted and the explosion will be damped in the combustion chamber.

Obviously, the constructional forms as disclosed are susceptible of various modifications without departing from the spirit of the invention.

What is claimed is:—

1. An internal combustion engine comprising a cylinder, a piston cooperating therewith, a combustion chamber of constant volume, an aperture affording communication between the cylinder and the same chamber, a valve adapted to close the said aperture and conduits for the supply of liquid fuel to the valve seating, in such manner that they are entirely obturated when the valve is applied upon its seat.

2. An internal combustion engine comprising a cylinder, a piston cooperating therewith, a combustion chamber of constant volume, an aperture affording communication between the cylinder and the said chamber, a valve adapted to close the said aperture, conduits for the supply of liquid fuel to the valve seating in such manner that they are entirely obturated when the valve is applied upon its seat, means controlling the said valve, and an oppositely-disposed seating formed in the bottom of the constant volume chamber upon which the said valve is supplied in a fluid-tight manner when lifted in order to uncover the said aperture.

3. In an internal combustion engine, the combination of a casing, a wall in said casing separating the latter into a cylinder and a combustion chamber, a piston in said cylinder, said wall having formed therein an opening and one or more fuel supply passages in communication with said opening, and a valve normally closing said passages and opening.

In testimony that I claim the foregoing as my invention I have signed my name hereto.

LOUIS BREGUET.